United States Patent [19]

Cudmore

[11] 4,390,148
[45] Jun. 28, 1983

[54] ROTARY WING DEVICE

[75] Inventor: Patrick J. Cudmore, Duxbury, Mass.

[73] Assignee: Wave-Rider, Inc., Duxbury, Mass.

[21] Appl. No.: 883,653

[22] Filed: Mar. 6, 1978

Related U.S. Application Data

[63] Continuation of Ser. No. 672,513, Mar. 31, 1976, abandoned, which is a continuation-in-part of Ser. No. 591,835, Jun. 30, 1975, abandoned.

[51] Int. Cl.³ .......................................... B64C 39/00
[52] U.S. Cl. ................................ 244/19; 46/74 R; 46/82; 273/425; 416/178; 244/21; 244/34 A
[58] Field of Search ............ 244/4 A, 23 C, 9, 34 A, 244/10, 17, 11, 19, 20, 21, 64; 416/111, 108, 178, 181, 187; 46/74 R, 740, 82, 87, 77; 273/425, 428

[56] References Cited

U.S. PATENT DOCUMENTS

| | | | |
|---|---|---|---|
| 1,283,129 | 10/1918 | Fisher | 416/111 |
| 1,761,053 | 6/1930 | Rystedt | 244/9 |
| 2,507,657 | 5/1950 | Wiesslev | 244/9 |
| 2,683,603 | 7/1954 | Gackenbach | 273/425 |
| 3,204,891 | 9/1965 | Cline | 46/74 R |
| 3,264,776 | 8/1966 | Morrow | 244/21 |
| 3,603,033 | 9/1971 | Mueller | 244/23 C |
| 3,801,047 | 4/1974 | Dell'Aquilla | 244/19 |

FOREIGN PATENT DOCUMENTS

| | | | |
|---|---|---|---|
| 35622 | 3/1930 | France | 244/19 |
| 198515 | 6/1923 | United Kingdom | 273/425 |
| 333680 | 8/1930 | United Kingdom | 244/20 |

*Primary Examiner*—Galen L. Barefoot
*Attorney, Agent, or Firm*—Thompson, Birch, Gauthier & Samuels

[57] ABSTRACT

A rotary wing device adapted to be rotated about its longitudinal axis and to be propelled forwardly with its longitudinal axis having a small upward pitch angle relative to the forward flight direction in order to generate an upward lifting force on the device. The rotary wing device has a plurality of laterally spaced-apart cylindrically disposed wing segments. Preferably, the wing segments are parallel to each other, are parallel to the longitudinal axis of the device, and have streamlined edges. Preferably, the wing segments are mounted for rotation about the longitudinal axis of the device by front and rear mounting rings which engage and stabilize the front and rear tips of the wing segments. The mounting rings are perpendicular to the wing segments and have streamlined edges. The preferred embodiment is a throwable aerial toy having its center of mass located on the forward half of its longitudinal axis and being statically and dynamically balanced relative to said longitudinal axis. The throwable aerial toy flies a considerable distance with a surprisingly flat straight line trajectory.

33 Claims, 16 Drawing Figures

U.S. Patent  Jun. 28, 1983  Sheet 1 of 3  4,390,148
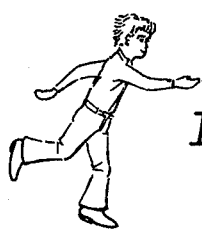
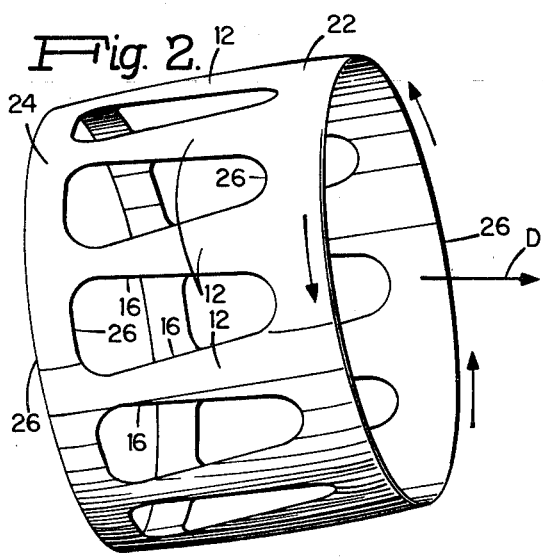
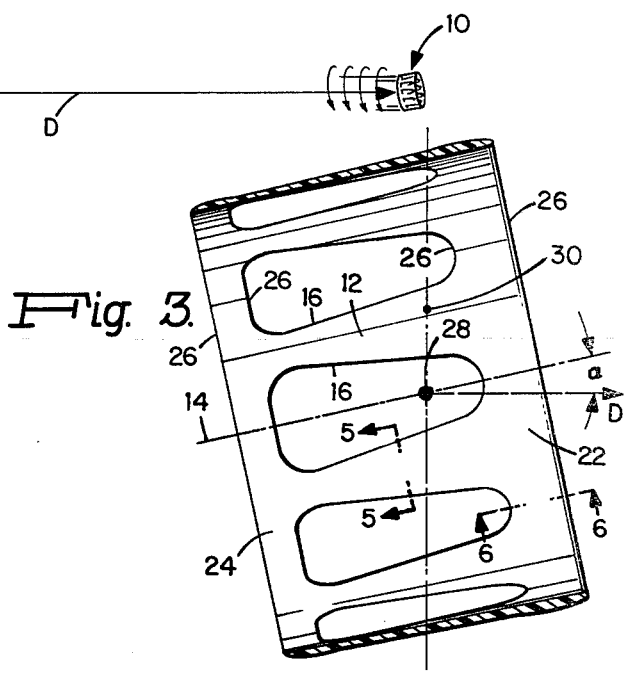
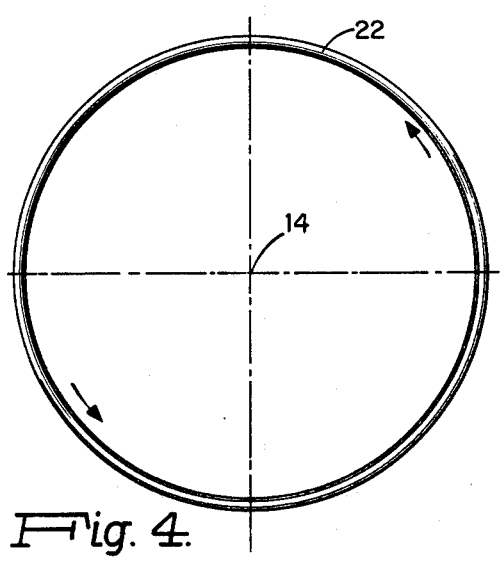
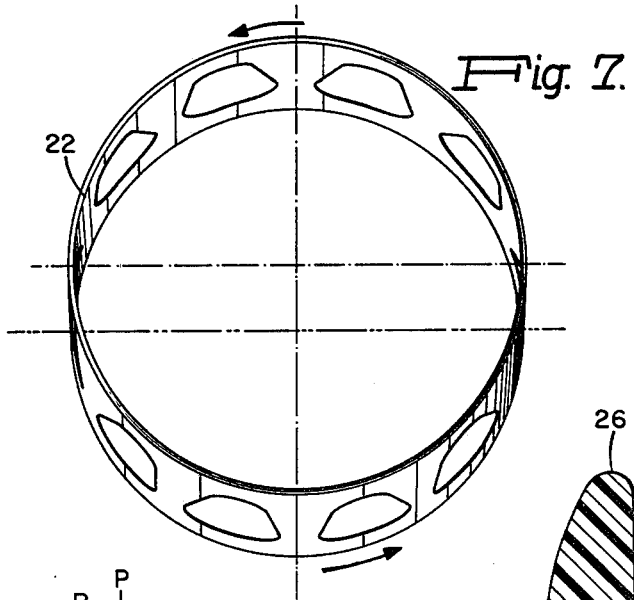
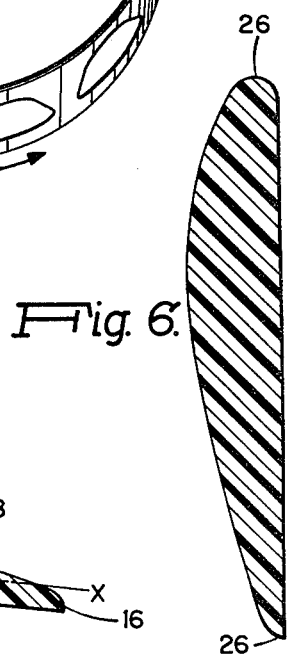
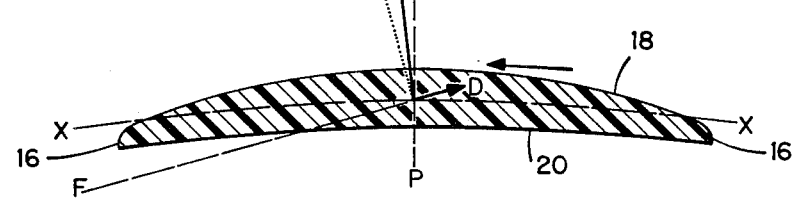

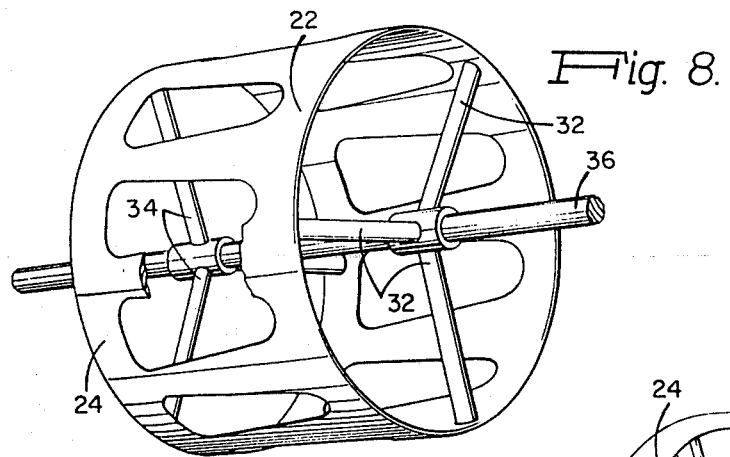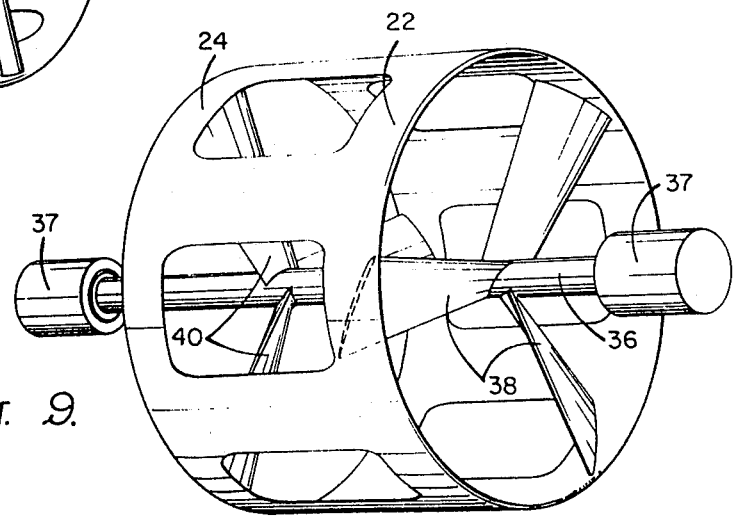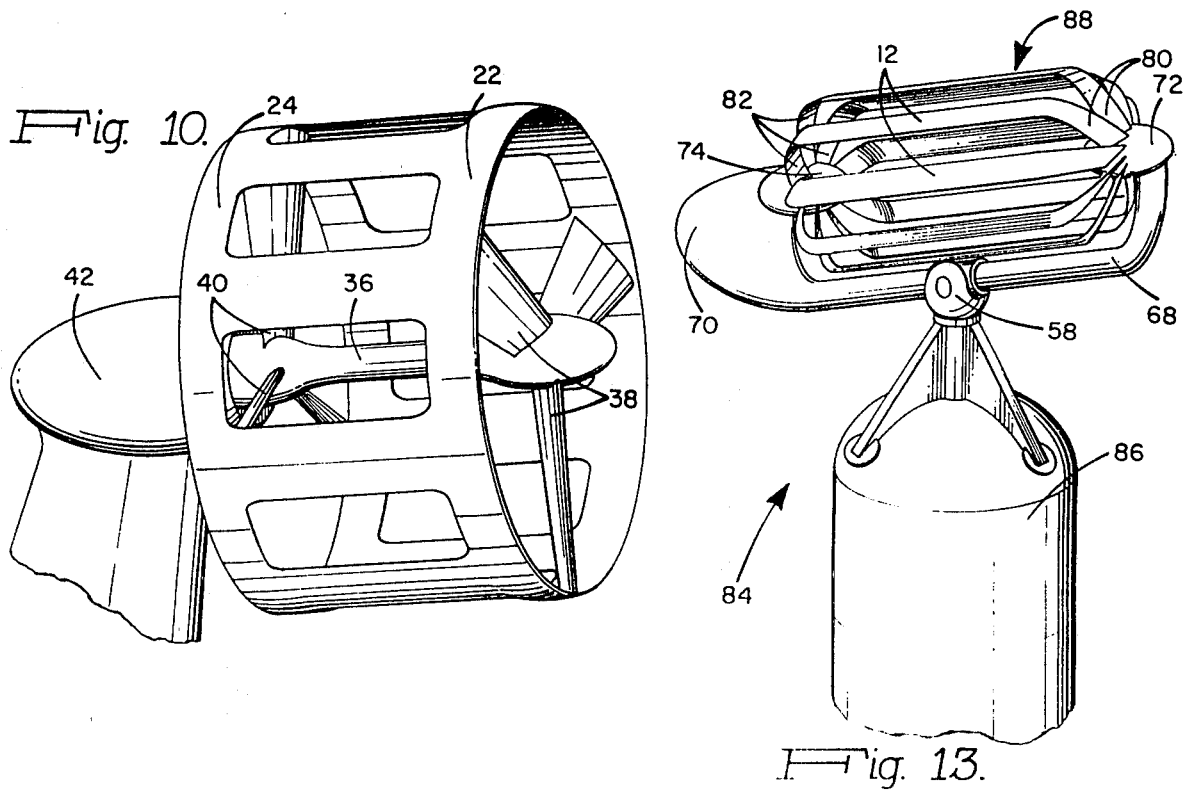

ROTARY WING DEVICE

CROSS-REFERENCE TO RELATED APPLICATIONS

This application is a continuation of application Ser. No. 672,513 filed Mar. 31, 1976, now abandoned, which in turn was a continuation-in-part of application Ser. No. 591,835 filed June 30, 1975, now abandoned.

BACKGROUND OF THIS INVENTION

There have been many previously known aerial projectiles which have been rotatably thrown or propelled through the air. Typical examples include footballs, so-called "Frisbee" flying saucers, so-called "Whiffle" balls, and boomerangs.

These projectiles, and other similar projectiles are intended to have gliding or exaggerated flight paths. However, they are either quite heavy, difficult to catch, difficult to keep on a level, straight line course, or difficult to throw very far. None of these projectiles is both lightweight and capable of achieving a long, level, straight line flight path which concludes with a soft landing.

It is an object of the preferred embodiment of this invention to provide a lightweight aerial projectile adapted to be rotated and to be propelled forwardly. The projectile is a rotary wing device which rotates forwardly like an airplane propeller; develops vertical lift like a helicopter rotor; sustains auto-rotational spin like a windmill; conserves its kinetic energy like a flywheel; automatically self-adjusts its pitch angle to optimize vertical lift generation; is aerodynamically self-stabilizing; and utilizes highly efficient, low drag wing elements. These properties impart to the device a virtually straight line flight trajectory and very long range.

It is another object of this invention to provide a rotary wing device which constitutes a major aeronautical advance, and which has an extremely wide array of diverse applications such as, but not limited to, free-flight projectiles, fixed or tethered lifting devices, windmills and aircraft. Most of the foregoing could either be non-powered or powered.

It is another object of this invention to provide an aerial toy which is small, lightweight, inexpensive to manufacture, safe and fun to play with.

SUMMARY OF THE INVENTION

This invention covers the broad category of rotary wing devices which are either powered or unpowered. The preferred embodiment is a free flight aerial projectile toy which is intended to be manually thrown and caught.

The rotary wing device is adapted to be rotated about its longitudinal axis and to be propelled forwardly relative to the apparent wind or other fluid environments. The device is self-orienting so that its longitudinal axis forms an angle of attack relative to the forward flight direction. This creates biasing forces on the device which act to lift the device perpendicularly and to cause it to auto-rotate.

The device has a plurality of wing segments which are laterally spaced-apart and which are disposed within the curved walls of an imaginary substantially cylindrical configuration. Mounting means, such as rings, hold the wing segments in position for rotation about the longitudinal axis of the device.

The center of mass of the device is on the longitudinal axis and the device is statically and dynamically balanced relative to the longitudinal axis.

The rotary wing device can be manually thrown; mechanically propelled; power-driven; tethered; or fixed in place with the wind or water flowing past the device. When the device is rotated and pitched at an angle to the flight direction, lift is produced perpendicularly in the plane of the angle, and the rotational spin is sustained by auto-rotational forces.

The basic device requires only laterally spaced-apart wing segments which are rotated to sweep the imaginary substantially cylindrical surface. There can be few or many wing segments. They can have various sizes, shapes, and orientations. A minimum requirement is that they be statically and dynamically balanced about the longitudinal axis of the device.

The device, when thrown or otherwise propelled, maintains a straight and level flight trajectory because of the automatic (i.e. self-operating) interaction of gyroscopic precessional, pitch-adjusting, self-stabilizing, and auto-rotational features. As its forward momentum diminishes, the device increases its pitch angle and maintains its rotational spin to maintain a constant amount of vertical lift. This produces the described flat trajectory and a gentle descent at the end of the flight.

The device also functions as a tethered device, such as a kite, or a movable device on a fixed support, such as a windmill or a weathervane, or as a propelled device. As a propelled device, it could provide the primary lifting means for an aircraft, surface craft or watercraft. The device provides lift or other biasing force generally perpendicularly out of the direction of forward flight (or relative motion) and therefore is useful for a wide variety of applications which require lift. There appears to be virtually no limit to such possible applications.

DESCRIPTION OF THE DRAWINGS

FIG. 1 is a perspective view of a child throwing the rotary wing device of this invention which is in the preferred embodiment of an aerial projectile.

FIG. 2 is a perspective view of the aerial projectile.

FIG. 3 is a side elevation of the aerial projectile showing its pitch angle during flight, showing portions in section.

FIG. 4 is a front elevation of the aerial projectile taken along its longitudinal axis.

FIG. 5 is a section taken along line 5—5 on FIG. 3 showing the wing segment cross-section.

FIG. 6 is a section taken along line 6—6 on FIG. 3 showing the front mounting ring cross-section.

FIG. 7 is a front elevation of the aerial projectile taken along its direction of flight showing its upward pitch angle.

FIG. 8 is a perspective view of a modified embodiment of the rotary wing device, the modified embodiment having spokes fixed to both of the mounting rings, and to the axle which is rotated by unshown powered means.

FIG. 9 is a perspective view of another modified embodiment of the rotary wing device, the modified embodiment having propeller-shaped spokes fixed to both of the mounting rings, and to the axle which is carried in bearings.

FIG. 10 is a perspective view of still another modified embodiment of the rotary wing device, the modified embodiment having propeller-shaped spokes fixed to both of the mounting rings, and to the axle which is rotated by a mechanical or electrical motor.

FIG. 13 is a perspective view of the windmill embodiment.

DESCRIPTION OF THE PREFERRED EMBODIMENT

Figure 11:
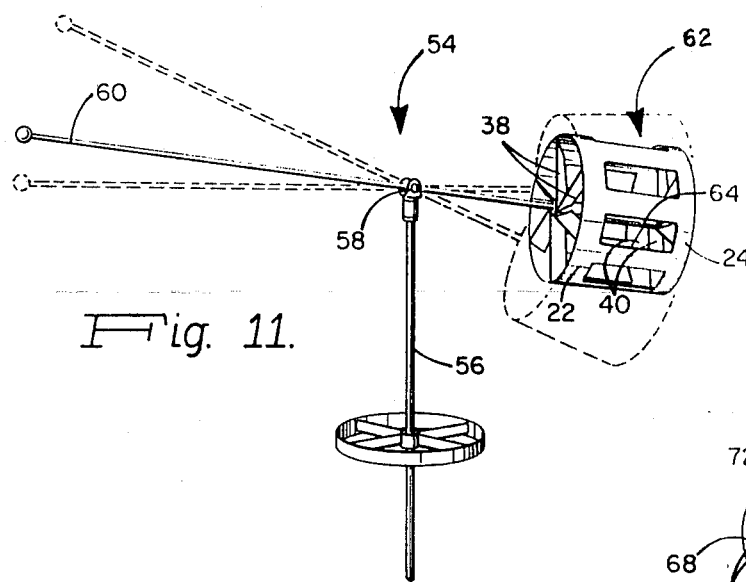
FIG. 11 is a perspective view of the weathervane embodiment.

FIG. 1 shows a child throwing the preferred embodiment of the invention, the aerial projectile 10. The projectile is thrown in the manner of a football, i.e. forwardly and rotatably, to produce a helical motion.

Referring now to FIGS. 2-4, projectile 10 is a rotary wing device having a plurality of laterally spaced-apart wing segments 12. The major or larger dimension of each segment 12 is called its longitudinal axis and the minor or smaller dimension is called its lateral axis. The wing segments 12 are disposed around and within the walls of an imaginary, hollow, open-ended, substantially cylindrical configuration. In other words, the wing segments are located within the geometrical bounds of the curved walls (having finite thickness) of an imaginary substantial cylinder.

FIGS. 2 and 3 show that, in the preferred embodiment, each wing segment (a) has its longitudinal axis substantially parallel to the longitudinal axes of the other wing segments; (b) has its longitudinal axis substantially parallel to the longitudinal axis 14 of the projectile; (c) has similarly stream-lined edges 16 on both of its longitudinal, i.e. major dimension sides; (d) has a lateral axis, i.e. minor dimension width which gradually increases towards the front end of the projectile; (e) has a radial thickness which gradually increases towards the front end of the projectile; (f) is one of a total of approximately ten wing segments; (g) has substantially parallel upper and lower major surfaces 18 and 20; and (h) has an arc of rotation X—X which is everywhere equidistant from the longitudinal axis of the projectile.

The wing segments 12 are mounted for rotation about the projectile's longitudinal axis 14. The mounting means in the preferred embodiment includes front mounting ring 22 and rear mounting ring 24. These rings engage the front and rear tips of the wing segments and fix them in position in the substantially cylindrical configuration.

It will be seen that, in the preferred embodiment, each mounting ring (a) is parallel to the other mounting ring; (b) has streamlined front and rear edges 26 and (c) the front ring has greater mass than the rear ring.

It will be appreciated that, within the scope of this invention, the wing segments 12 could alternatively be non-parallel to the longitudinal axis 14 of the projectile; be non-parallel to each other; have non-streamlined edges 16; have a constant width and thickness; have a total of few or many segments, or even be a single helical segment; have non-parallel upper and lower major surfaces 18 and 20; and/or have an arc of rotation X—X which is not everywhere equidistant from longitudinal axis 14, and/or be canted or tipped at an angle to the arc of rotation.

It will be further appreciated that, within the scope of this invention, the mounting rings 22 and 24 could alternatively be a single ring or be eliminated entirely; be non-continuous; be non-parallel; have non-streamlined edges 26; and/or be equal to each other in mass.

It has been stated previously that the wing segments 12 are disposed within the curved walls of an imaginary, hollow, open-ended, substantially cylindrical configuration. This configuration could be a cylinder, having a circular or polygonal cross-section, but preferably, for injection molding purposes, would be a truncated cone having sides which form an angle with the longitudinal axis 14 of about 1° (with an acceptable angular range of about 0.25° to 5°).

Preferably, the substantially cylindrical configuration has a diameter to length ratio of about 3:2 (with an acceptable ratio range of about 1:5 to 5:1). The outer diameter to inner diameter ratio is about 3.00:2.88 (with an acceptable ratio range of about 3.00:2.50 to 3.00:2.95). The inner diameter is about 7.7 cm. (with an acceptable range of about 6.5 to 9.0 cm.). The outer diameter is about 8.0 cm. (with an acceptable range of about 6.7 to 9.2 cm.). The thickness of the configuration walls is equal to the thickness of the wing segments.

Also, preferably the projectile is made of high density polyethylene having a specific gravity of less than 1.00 so that the projectile will float if it falls into the water. For maximum efficiency and economy, the projectile is preferably manufactured by the injection molding process. Obviously, the foregoing examples of preferred material and manufacturing process can be varied within the scope of this invention.

The projectile has a center of mass 28 located on the longitudinal axis 14 (see FIG. 3). The projectile must be statically and dynamically balanced relative to longitudinal axis 14. Preferably, the center of mass 28 is located forward of a plane bisecting the longitudinal axis 14 and is about ⅜ of the way back from the front of the projectile.

The projectile 10 is intended to be thrown manually. Other forms of the claimed rotary wing device are adapted to be initially propelled by a mechanical launcher, to be tethered by a flexible line, to be pivoted on a fixed standard, to be continuously driven by an integral auxiliary propulsion means, and/or to be initially or continuously advanced relative to the surrounding air or water by any natural or man-made source of power.

Referring now to the preferred embodiment of the projectile 10, it will be seen that the projectile is intended to be manually thrown substantially in the manner of a football, i.e. forwardly and rotatably. Furthermore, it should be thrown so that its front end is tipped up as shown in FIG. 3. Thus, the projectile's longitudinal axis 14 will form an angle $\alpha$ between longitudinal axis 14 and the direction of flight D. If the longitudinal axis 14 and the direction of flight D are both contained in a single vertical plane, the angle of attack is entirely an upward pitch angle without any yaw angle. However, if the plane containing longitudinal axis 14 and flight direction D is other than vertical, then a yaw angle component is present.

As the projectile 10 rotates forwardly through the air or water, its angle of attack causes a biasing force to be generated on the projectile which acts substantially perpendicularly to the longitudinal axis 14 and in the plane which contains the longitudinal axis and the direction of flight. The biasing force is the resultant of the lift component and the drag component on the projectile. If the projectile is thrown with solely an upward pitch angle, the biasing force is in a vertical plane. If the projectile is thrown with any yaw angle component, the biasing force is not in a vertical plane.

Because projectile 10 has two types of motion, rotary and forward, an explanation of how lift is produced on the projectile is necessarily somewhat complex. It is believed that because of the claimed construction of the device, aerodynamic, gyroscopic and perhaps other forces all combine to cause the projectile to achieve a straight and level flight trajectory. This achievement is made possible by generating substantially constant vertical lift throughout the flight and by generating stabilizing moments throughout the flight.

There are many variable factors which will affect the flight path of the projectile. The wind speed and wind direction are important. The projectile's rotational speed, forward speed and angle of attack are also important. Other factors may also affect the flight path, but to a lesser extent.

The projectile maintains a level flight path because the amount of lift which is generated on the wing segments and on the mounting rings (the latter being of only minor importance) is maintained substantially constant. As the forward speed of the projectile decreases, the amount of lift produced would be expected to decrease. However, in this projectile the amount of lift produced by the wing segments is maintained because the aspect ratio increases, the effective lift area increases, and the angle of attack increases.

As the forward speed of the projectile slows, and as auto-rotation (to be explained subsequently) causes the wing segments to substantially maintain their rotational speed, the air flow passes over the wing segments along a path which is more closely aligned with their lateral axis. This produces more efficient lift for the same reason that perpendicular high aspect ratio wings (e.g. glider wings) have greater lifting efficiency than do swept-back low aspect ratio wings (e.g. jet plane wings). In other words, the wing segments of the preferred embodiment become longer and narrower relative to the apparent wind.

Also, as the forward speed of the projectile slows, and the aspect ratio of the wing segments increases, the effective lift area of each wing segment also increases. The closer alignment of the airflow with the lateral axis of the wing segments sweeps air flowing from the leading edge to trailing edge over more of the effective wing area, particularly at the wing tips.

Also, as the aspect ratio and the effective lift area of the wing segments increase, the center of lift 30 moves forward relative to the center of mass 28. This creates a counter-clockwise moment about the center of mass 28 causing the angle of attack to increase. As this "pitching up" occurs, the lifting force increases. Thus, as the projectile slows its forward speed, and the primary lifting force tends to decrease, the increased wing aspect ratio and increased effective lift area offsets this decrease by providing a more effective lifting surface and by causing the lifting surface to be pitched at a greater angle of attack.

It will be understood that each wing segment rotates through 360° each cycle and produces a continuously changing lifting force on the projectile (see FIG. 7). Broadly speaking, each wing segment has a maximum lifting effectiveness at 0° and at 180° and has a minimum lifting effectiveness at 90° and at 270°. Actually, the lifting effectiveness is relatively high for all portions of the cycle except for approximately 75° to 105° and 255° to 285°.

Relative to the apparent wind, the wing segments invert semi-cyclically (at 90° and 270°) and it is believed that a wing symmetrically curved top and bottom would be more efficient than that shown in FIG. 5. The asymmetric wing used in the preferred embodiment is dictated by mass production constraints.

In flight, the projectile tends to maintain a straight line flight path for at least three reasons. First, the spinning motion produces a gyroscopic stabilizing effect. Second, the hollow structure of the projectile produces a self-stabilizing "weathervaning" effect. Third, the angle of attack of the working wing segments increases because of the device's automatic pitch adjusting effect. These three forces automatically interact to maintain the projectile in a substantially constant flight trajectory.

It will be noted that the side edges 16 of the wing segments are both streamlined so that the projectile can be thrown equally effectively with either a clockwise or counterclockwise rotation. Thus, both left-handed and right-handed throwers can use the same projectile with similar results. In uses requiring only one direction of rotation, a wing with a thickened and more rounded leading edge would be more efficient than that shown in FIG. 5.

Referring now to FIG. 5, it will be seen that a vector force diagram illustrating auto-rotation is illustrated. As air flow F impinges upon wing segment 12 it produces lift L, perpendicular to the air flow F, and drag D, parallel to the air flow F. The resultant force R is shown to be forward of radial line P—P which is perpendicular to the arc of rotation X—X.

It will be appreciated that resultant force R will always be forward of line P—P if lift is sufficiently large relative to drag. When this occurs, force component R tends to pull wing segment 12 forward along the arc of rotation X—X. This is called auto-rotation. It occurs in a similar manner in the bottom semi-cycle of rotation when the wing is inverted. The auto-rotational force on the preferred embodiment 10 causes the propelled, spinning device to continue rotating at a substantially constant rate throughout virtually all of the flight.

The device also acts as a very efficient flywheel to store and to release its kinetic energy. This flywheel effect enhances the time span of rotation and also sustains rotation between the pulses of auto-rotational force that are delivered by the wing segments. Auto-rotational forces obviously augment the flywheel effect and assist in maintaining gyroscopic stability.

The preferred embodiment utilizes a manual forward and rotary throw for the initial propulsion. After that, aerodynamic and gyroscopic means automatically operate to maintain lift, to maintain flight stability, to control the angle of attack, and to maintain the speed of rotation. By employment of these automatic means, uniform lift and directional stability are produced to achieve straight and level flight.

The foregoing discussion completes the description of the preferred embodiment of this invention. Several modified embodiments are shown in FIGS. 8–16.

In these embodiments, instead of being manually rotated and manually propelled forwardly, the rotary wing device is alternatively attached to a longitudinal axle by streamlined spokes, and rotated about the axle and propelled forwardly by unshown powered means (see FIG. 8); or the device is attached to an axle by a multi-bladed propeller, and propelled forwardly by unshown means (see FIG. 9); or the device is attached to an axle by a multi-bladed propeller, and propelled forwardly by means of a motor which drives the propeller (see FIG. 10).

FIG. 8 shows the basic concept of a rotary wing device having front and rear conventional spokes 32 and 34 which are fixed at their outer ends to front and rear mounting rings 22 and 24, respectively. The inner ends of the spokes are either fixed to a rotating axle 36 or are fixed to two hubs (or a long single hub) which are carried by a stationary axle 36. The device is rotated about or with the axle by an unshown power source. The device is also propelled forwardly relative to the surrounding atmosphere by an unshown power source, such as a tether, or a fixed pivot, or motor-driven propulsion means.

FIG. 9 shows the basic concept of a rotary wing device having front and rear propeller-shaped spokes 38 and 40 which are fixed at their outer ends to both the front and the rear mounting rings 22 and 24, respectively. The inner ends of the propellers are either fixed to a rotating axle 36 carried by two bearings 37, or are fixed to two hubs which are carried by a stationary axle 36. The device is propelled forwardly relative to the surrounding atmosphere by an unshown power source, such as a tether, or a fixed pivot, or a motor to drive other (unshown) propellers, or other motor-driven propulsion means. The device is rotated by reaction of the shown propellers to the forward passage of the device through the surrounding atmosphere.

FIG. 10 shows the basic concept of a rotary wing device having front and rear propeller-shaped spokes 38 and 40 which are attached to the mounting rings 22 and 24, and to axle 36, in a manner similar to that of FIG. 9. The propellers are motor-drivn by a power unit 42 causing the device to be propelled forwardly relative to the surrounding atmosphere. The power unit 42 also causes the device to be rotated as it moves forwardly.

FIGS. 8–10 are presented solely for the purpose of illustrating three modified basic concepts of this invention. In all three of these concepts, means are provided for both rotating the device with or about its axle and for propelling it forwardly through the surrounding atmosphere.

FIGS. 11–16 show specific embodiments based upon the FIGS. 8–10 concepts. These more detailed embodiments will now be discussed.

FIG. 11 shows a weathervane 54 which is designed to indicate both wind direction and approximate wind speed. Weathervane 54 includes a fixed vertical post 56 which has a universal mounting 58 at its upper end. Mounting 58 can itself freely swivel about a vertical axis and incorporates a horizontal pin upon which vane rod 60 is pivotally mounted. Mounting 58 also incorporates a fixed stop to limit the size of the angle which vane rod 60 can form by dropping below the horizontal.

At one end of vane rod 60 is a rotary wing device 62 similar to that shown in FIG. 9. Device 62 has front and rear propellers 38 and 40 which are fixed at their tips to front and rear mounting rings 22 and 24, respectively. The propellers are also fixed at their inner ends to a long tubular hub 64 which is mounted for rotation on vane rod 60.

Vane rod 60 pivots about the vertical post 56 to indicate wind direction in a conventional manner. Additionally, weathervane 54 indicates approximate wind speed without the use of instrumentation. This function is accomplished by the action of the wind on the rotary wing device 62.

Under conditions of light wind, device 62 spins slowly at a large pitch angle and therefore produces a small but significant amount of lift. Therefore, weathervane 54 assumes an attitude of maximum pitch as shown in dotted in FIG. 11. As the wind speed increases, the propellers spin the device 62 at a greater speed to produce greater lift. This increased lift is counteracted to a limited extent by the pivotally reduced pitch angle of vane rod 60 which rises on the pivoted mounting 58 so that weathervane 54 assumes the intermediate position shown in FIG. 11. At higher wind speeds, the propellers spin device 62 at higher speeds to produce still greater lift. Again, this is counteracted to a certain extent by the further reduced pitch angle. This greater lift causes weathervane 54 to assume the virtually horizontal position shown in dotted in FIG. 11.

Weathervane 54 functions to visually indicate wind direction and wind speed, simultaneously. The rotary wing device 62 is self-starting and falls into the category of this invention which has the fixed pivot means for propelling the device forwardly relative to the surrounding atmosphere, and has the propeller means for rotating the device about its longitudinal axis.

Figure 12:
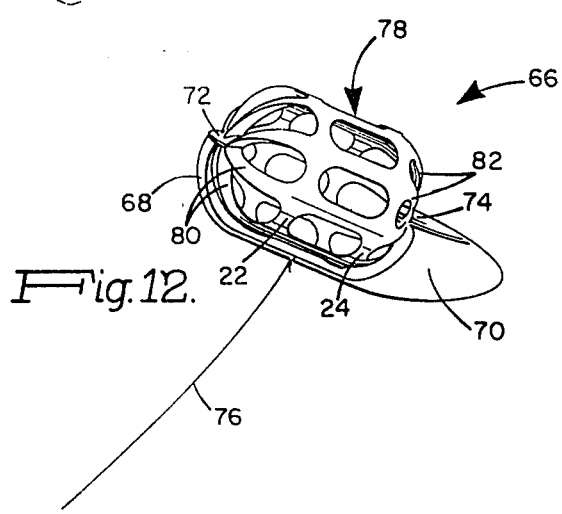
FIG. 12 is a perspective view of the tethered kite embodiment.

FIG. 12 shows a kite 66 which has an external frame 68 incorporating a vertical stabilizing tail 70. Frame 68 includes front and rear stub axles 72 and 74. A flexible tether 76 (e.g. kite string) is attached to external frame 68 at a point which is slightly forward of the kite's center of lift.

A rotary wing device 78, similar to that shown in FIG. 9, is rotatably mounted on stub axles 72 and 74. Device 78 has multi-bladed front and rear propellers 80 and 82 which are fixed at their tips to front and rear mounting rings 22 and 24, respectively. The inner ends of the propellers are rotatably carried by the stub axles.

Kite 66 is flown in a conventional manner. The propellers cause the device 78 to spin in reaction to air flow. As wind speed and resultant rotational speed increase, lift increases and the kite rises. As wind speed and resultant rotational speed decreases, lift decreases. However, despite decreased rotational speed, the kite will still generate substantial lift because as it falls, the device 78 will present an increasing pitch angle to the wind which creates significant lift even at low wing speeds.

The kite of FIG. 12 can be produced as a toy kite. However, it can also be adapted to carry a payload, such as a man or equipment. One interesting possibility would be to tow a radio antennae-equipped kite behind a ship to improve communication reception.

The rotary wing device 78 of the kite embodiment is self-starting and falls into the category of this invention which has the tether means for propelling the device forwardly relative to the surrounding atmosphere, and has the propeller means for rotating the device about its longitudinal axis.

FIG. 13 shows a windmill 84 which has an external frame 68, a vertical tail 70, and front and rear stub axles 72 and 74, similar to those used on the kite 66 of FIG. 12. The frame 68 is pivoted on a universal mounting 58 on a tall vertical structure 86. The mounting 58 is located at a point which is slightly forward of the windmill's center of lift.

A rotary wing device 88, similar to that shown in FIG. 9, is rotatably mounted on the stub axles. Device 88 has multi-bladed front and rear propellers 80 and 82 which are fixed at their blade tips directly to the ends of the wing segments 12. In this configuration, the number of propeller blades of each propeller equals the number of wing segments, and the mounting rings are therefore omitted.

Windmill 84 can be used to generate electric power or for related purposes. Conventional windmills usually have shut-down or complicated overspeed controls to prevent the disintegration of the blades or their supports under the effect of high speed centrifugal and axial forces. Windmill 84 obviates the need for such shut-down or overspeed controls. This is a tremendous advantage because it permits windmill operation during high wind speed conditions when highest windmill rotor speed or torque (and resultant power generation) can be achieved.

Under light wind conditions, the propellers of device 88 cause the device to turn slowly. As the wind speed increases, the amount of vertical and auto-rotational lift increases and device 88 becomes more horizontal thereby decreasing the pitch angle. In high winds, device 88 becomes virtually horizontal, thereby reducing the pitch angle to virtually zero. This automatic pitch adjustment effectively "feathers" wing segments 12 in high winds and avoids destructive axially rearward or centrifugal forces.

In comparison, a conventional windmill in high winds creates tremendous loading forces rearwardly along the rotor axis, as well as tremendous centrifugal forces. These forces are both virtually eliminated in windmill 84.

The rotary wing device 88 of the windmill embodiment is self-starting and falls into the category of this invention which has the fixed pivot means for propelling the device forwardly relative to the surrounding atmosphere, and has the propeller means for rotating the device about its longitudinal axis.

Figure 14:
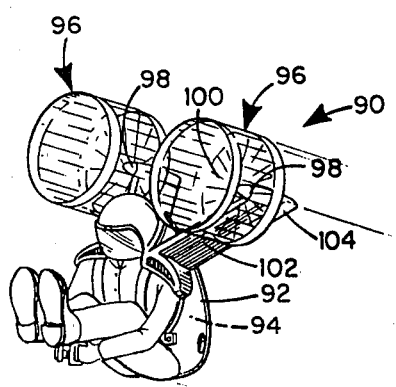
FIG. 14 is a perspective view of the powered backpack embodiment.

FIG. 14 shows a back pack flight propulsion unit 90. The unit includes a back pack 92 designed to be affixed to the flier. The back pack is also designed to house a small but powerful power source, such as an internal combustion engine 94. The unit 90 includes one or more rotary wing devices 96, similar to that shown in FIG. 10, each of which is mounted on a rotatable axle shaft 98. Each device has a rear propeller 100 which is fixed at its blade tips to rear mounting ring 24, and which is fixed at its inner ends to a hub which turns with axle 98.

Each axle 98 is carried by bearings mounted in a dihedral stabilizer 102 which encloses a drive shaft and which includes an adjustable pitch trim control surface 104. Engine 94 is geared to the drive shaft which is geared to the axle in order to rotate device 96. Hand-held controls are operated by the flier to adjust engine speed and to reposition the control surfaces 104.

The flight operation will now be explained. In order to take off, the flier advances the engine to full power to drive the two devices (in counter-rotation) at maximum rotary speed. The flier then runs into the wind and leans back to achieve a maximum pitch angle for maximum lift off the ground. Forward speed in flight is produced by the speed of the propellers, and vertical lift is produced by the speed and the pitch angle of the wing segments.

Turning (yawing and rolling) is induced by a combination of arm and leg positioning by the flier and by control surface positioning. Pitching for ascent and descent is similarly induced. Landing is similar to taking off except that the engine speed is gradually decreased and very little forward motion is required. That is, pitch angle is maximized and rotational speed is reduced gradually.

Flying the back pack unit 90 will be a thrilling experience for the flier. By altering the position of his body, the flier can completely control his flight path. For example, FIG. 14 shows the flier in a streamlind "tuck" position which produces high speed flight. As the flier changes his body position, he changes the location of the overall center of gravity. Also, as the flier changes the position of the control surfaces 104, he changes the location of the overall center of lift. Both of these locations affect the pitch, yaw and roll angles of the rotary wing devices 96.

The rotary wing device 96 of the back pack unit embodiment is self-powered and falls into the category of this invention which has the motor-driven means for rotating the device about its longitudinal axis, and has the motor-driven propeller means for propelling the device forwardly relative to the surrounding atmosphere.

Figure 15:
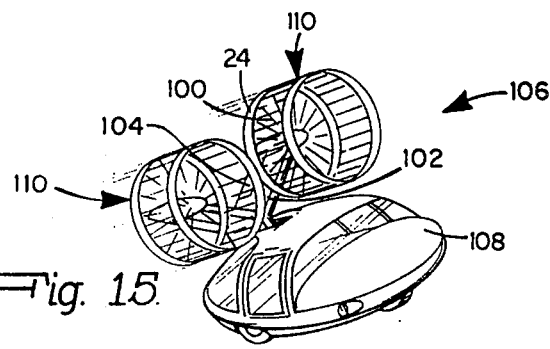
FIG. 15 is a perspective view of the powered automobile embodiment.

FIG. 15 shows an automobile-mounted flight propulsion unit 106. This unit includes an automobile-like vehicle 108 which supports one or more rotary wing devices 110. The vehicle 108 houses a power source as well as means for pivotally adjusting the pitch angle of the rotary wing devices 110. In virtually all other respects, unit 106 is similar to back pack unit 90.

To fly unit 106, the driver proceeds in a fashion similar to that of the flier with the back pack unit 90. To take off, the driver advances the engine to full power to drive the counter-rotating devices 96 at maximum rotary speed. The devices are pivoted rearwardly to the maximum pitch angle, and the vehicle 108 is driven into the wind. This procedure produces maximum lift to launch the unit into flight.

Once aloft, forward speed is controlled by engine speed modulation, and roll, pitch and yaw are controlled by pivoting the devices 110, and by repositioning control surfaces 104. Landing the automobile-mounted unit 106 is similar to landing the back pack unit 90.

Figure 16:
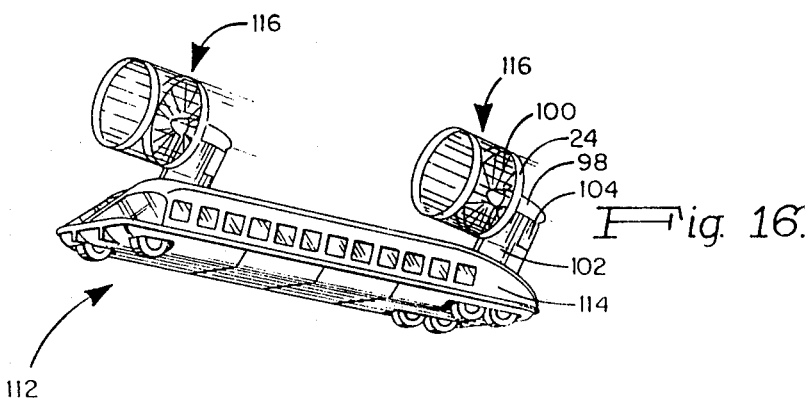
FIG. 16 is a perspective view of the powered bus embodiment.

FIG. 16 shows a bus-mounted flight propulsion unit 112. This unit includes a bus-like vehicle 114 which supports fore and aft rotary wing devices 116. The vehicle 114 houses two independent power sources as well as two independent means for pivotally adjusting the pitch angles of the rotary wing devices 116. In virtually all other respects, unit 112 is similar to automobile-mounted unit 106 and to back pack unit 90.

Flying the unit 112 is quite similar to flying the automobile-mounted unit 106. The only difference is that the two rotary wing devices 116 are independently controllable with regard to pitch and to propeller speed. This provides the bus driver with a means for controlling the overall pitch of the unit 112 by independently adjusting the relative lift of the separate rotary wing devices 116.

FIGS. 14–16 are intended to illustrate vehicles that can be driven on the ground or through the air. They could also be driven on the water surface or underwater. The units are compact and have both civilian and military applications.

The shown rotary wing devices employ fixed wing segments. To even further enhance the lifting effectiveness of the wing segments, it is feasible to provide a mechanical system to semi-cyclically modify the pitch of the rotating wing segments.

In view of the foregoing, it must be appreciated that it is believed that this invention is very basic and that, although an aerial projectile has been illustrated as a preferred embodiment, this was done solely because of its simplicity and not because there is any intention to limit the patent coverage to the preferred embodiment. This invention covers a broad range of rotary wing devices, both powered and non-powered. Its entire range of applications can now be only imagined.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. An open-ended rotary wing device adapted to be rotated about its longitudinal axis and to be propelled forwardly relative to the surrounding fluid with its longitudinal axis having a small upward pitch angle of attack relative to the forward flight direction in order to generate an upward lifting biasing force on said device, the biasing force acting substantially perpendicularly to the longitudinal axis and in the plane which includes both the longitudinal axis and the forward flight direction, said rotary wing device comprising:
   (a) a plurality of longitudinally extending, laterally spaced-apart wing segments disposed in a hollow, open-ended, substantially cylindrical configuration, said wing segments being mounted for rotation about the longitudinal axis of said device;
   (b) each said wing segment having a longitudinal dimension greater than its lateral dimension;
   (c) the center of mass of said rotary wing device being located along the forward 25% to 45% of the longitudinal axis of said device, said device being statically and dynamically balanced relative to the longitudinal axis of said device; and
   (d) said wing segment shape and orientation constituting aerodynamic means for automatically and gradually increasing the effective wing span of said wing segments as the forward speed of said device slows, thereby causing the center of lift of said device to move longitudinally forward of the center of mass, thereby causing the pitch angle of said device to increase, and thereby causing substantially constant speed auto-rotation of said device, all thereby generating a substantially constant lifting force on said wing segments to produce a substantially flat trajectory flight path for said device.

2. The device of claim 1 wherein said substantially cylindrical configuration is a truncated cone having sides which form an angle with the longitudinal axis of said device in the range of 0.25° to 5°.

3. The device of claim 1 wherein said wing segments have longitudinal axes which are substantially parallel to each other.

4. The device of claim 3 wherein the longitudinal axis of each said wing segment is substantially parallel to the longitudinal axis of said device.

5. The device of claim 3 wherein the longitudinal axis of each said wing segment forms an angle of less than 45° relative to the longitudinal axis of said device.

6. The device of claim 1 wherein each said wing segment has a width which gradually increases towards the front end of said substantially cylindrical configuration.

7. The device of claim 1 wherein each said wing segment has a thickness which gradually increases towards the front end of said substantially cylindrical configuration.

8. The device of claim 1 wherein at least one mounting ring is provided for rotatably mounting said wing segments, said mounting ring engaging and stabilizing all said wing segments.

9. The device of claim 1 wherein front and rear mounting rings are provided for rotatably mounting said wing segments, said front and rear mounting rings engaging and stabilizing the front tips and the rear tips, respectively, of said wing segments.

10. The device of claim 9 wherein each said mounting ring has streamlined edges.

11. The device of claim 9 wherein the side edges of said wing segments are streamlined to enhance rotational speed, and the front and rear edges of said front and rear mounting rings are streamlined to enhance forward speed.

12. The device of claim 9 wherein said front mounting ring has a greater mass than said rear mounting ring.

13. The device of claim 1 wherein said substantially cylindrical configuration has a diameter to longitudinal length ratio in the range of 1:5 to 5:1.

14. The device of claim 1 wherein said substantially cylindrical configuration has an outer diameter to inner diameter ratio in the range of 3.00:2.50 to 3.00:2.95.

15. The device of claim 1 wherein said substantially cylindrical configuration has an inner diameter in the range of 6.5 to 9.0 cm. to permit said device to be conveniently slipped onto a person's wrist or arm.

16. The device of claim 1 wherein said substantially cylindrical configuration has an outer diameter in the range of 6.7 to 9.2 cm. to permit said device to be comfortably gripped for throwing.

17. The device of claim 1 wherein said plurality of wing segments includes from 5 to 15 wing segments.

18. The device of claim 1 further including a vehicle upon which said device is mounted.

19. The device of claim 1 further including a stationary support upon which said device is movably mounted.

20. The device of claim 1 further including means for carrying a payload.

21. The device of claim 1 further including a harness for mounting said device on a payload.

22. The device of claim 1 further including a tether attached at one end thereof to said device.

23. An open-ended rotary wing device adapted to be rotated about its longitudinal axis and to be propelled forwardly relative to the surrounding fluid with its longitudinal axis having a small angle of attack relative to the forward flight direction in order to generate a biasing force on the device, the biasing force acting substantially perpendicularly to the longitudinal axis and in the plane which includes both the longitudinal axis and the forward flight direction, said rotary wing device comprising:
   (a) a plurality of longitudinally extending, laterally spaced-apart wing segments disposed in a hollow, open-ended, substantially cylindrical configuration, said wing segments being mounted for rotation about the longitudinal axis of said device;

(b) each said wing segment having a longitudinal dimension greater than its laterial dimension, each said wing segment having rounded streamlined lateral side edges, and each said wing segment being symmetrical in lateral cross-section wherein one side of said wing segment is the mirror image of the other side of the said wing segment;

(c) front and rear mounting rings provided on said device for rotatably mounting said wing segments, said front and rear mounting rings engaging and stabilizing the front tips and the rear tips, respectively, of said wing segments, said front mounting ring having a greater mass than said rear mounting ring; and (d) the center of mass of said rotary wing device being located on the longitudinal axis of said device, said device being statically and dynamically balanced relative to the longitudinal axis of said device.

24. The device of claim 23 or claim 1 further having means for rotating said device about its longitudinal axis.

25. The device of claim 24 wherein said rotating means is mechanically powered.

26. The device of claim 24 wherein said rotating means is electrically powered.

27. The device of claim 24 wherein said rotating means includes a propeller.

28. The device of claim 24 further having means for propelling said device forwardly relative to the surrounding fluid.

29. The device of claim 28 wherein said propelling means is mechanically powered.

30. The device of claim 28 wherein said propelling means is electrically powered.

31. The device of claim 28 wherein said propelling means includes a propeller.

32. The device of claim 23 wherein the center of mass of said rotary wing device is located along the forward 25% to 45% of the longitudinal axis of said device.

33. An open-ended rotary wing device adapted to be rotated about its longitudinal axis and to be propelled forwardly relative to the surrounding fluid with its longitudinal axis having a small upward pitch angle of attack relative to the forward flight direction in order to generate an upward lifting biasing force on said device, the biasing force acting substantially perpendicularly to the longitudinal axis and in the plane which includes both the longitudinal axis and the forward flight direction, said rotary wing device comprising:

(a) a plurality of longitudinally extending, laterally spaced-apart wing segments disposed in a hollow, open-ended, substantially cylindrical configuration, said wing segments being mounted for rotation about the longitudinal axis of said device;

(b) each said wing segment having a longitudinal dimension greater than its lateral dimension, each said wing segment having rounded streamlined lateral side edges, and each said wing segment being symmetrical in lateral cross-section wherein one side of said wing segment is the mirror image of the other side of said wing segment;

(c) the center of mass of said rotary wing device being located along the forward 25% to 45% of the longitudinal axis of said device, said device being statically and dynamically balanced relative to the longitudinal axis of said device; and (d) said wing segment shape and orientation constituting aerodynamic means for automatically and gradually increasing the effective wing span of said wing segments as the forward speed of said device slows, thereby causing the center of lift of said device to move longitudinally forward of the center of mass, thereby causing the pitch angle of said device to increase, and thereby causing substantially constant speed auto-rotation of said device, all thereby generating a substantially constant lifting force on said wing segments to produce a substantially flat trajectory flight path for said device.

* * * * *